(12) United States Patent
Muller

(10) Patent No.: US 6,249,727 B1
(45) Date of Patent: Jun. 19, 2001

(54) METHOD AND APPARATUS FOR CUSTOMIZING AND LIMITING OPERATION OF MACHINE SUBSYSTEMS

(75) Inventor: Thomas P. Muller, Montgomery, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/314,641

(22) Filed: May 19, 1999

(51) Int. Cl.[7] .............................. G06F 17/00; E02F 9/20
(52) U.S. Cl. ................................ 701/36; 701/50; 37/414
(58) Field of Search ............................... 701/50, 36, 104, 701/2; 37/414, 415; 235/376, 384, 375

(56) References Cited

U.S. PATENT DOCUMENTS

| | | | |
|---|---|---|---|
| 5,065,326 | * 11/1991 | Sahm | 701/50 |
| 5,172,785 | * 12/1992 | Takahashi | 180/271 |
| 5,250,761 | * 10/1993 | Koyanagi | 177/141 |
| 5,467,277 | * 11/1995 | Fujisawa et al. | 701/51 |
| 5,513,107 | 4/1996 | Gormley | 364/424.05 |
| 5,703,345 | 12/1997 | Gollner et al. | 235/384 |
| 6,032,089 | * 2/2000 | Buckley | 701/36 |

FOREIGN PATENT DOCUMENTS 6-116982 * 4/1994 (JP) .

* cited by examiner

Primary Examiner—Michael J. Zanelli
(74) Attorney, Agent, or Firm—Haverstock, Garrett & Roberts; Liza J. Meyers

(57) ABSTRACT

The present method and apparatus provide a control system on a machine including an electronic controller for controlling operation of at least one subsystem, an internal data storage device containing data readable by the controller representative of an allowable range for controlling an operating parameter for the subsystem, and a data interface operable for allowing the controller to access data contained in an external data storage device. The present method and apparatus additionally provide an external data storage device containing data accessible by the controller representative of at least one preferred value for controlling the operating parameter. The controller is operable to access the at least one preferred value and compare it to the allowable range, and if the at least one preferred value is within the allowable range, then selecting the at least one preferred value for controlling the operating parameter, and if the at least one preferred value is beyond the allowable range, then selecting the allowable range for controlling the operating parameter. Additionally, preferably the data contained in the portable external data storage device is readable by controllers of at least one other machine for customizing or limiting operation of at least one operating parameter thereof, and the card is movable from machine to machine. The preferred value can optionally be a global limiting factor for customizing or limiting operation of a plurality of subsystems of one or more machines.

22 Claims, 2 Drawing Sheets

METHOD AND APPARATUS FOR CUSTOMIZING AND LIMITING OPERATION OF MACHINE SUBSYSTEMS

TECHNICAL FIELD

This invention relates generally to systems for controlling operational aspects of machines such as work machines, motor vehicles, and the like, and more particularly, to a method and apparatus for customizing and/or limiting operation of machine subsystems such as engine, hydraulic, and operator comfort subsystems using information stored on a portable, external data storage device which can be moved from machine to machine.

BACKGROUND ART

Currently, it is known to store limiting parameters for operation of various machine subsystems in an onboard or internal memory or data storage device associated with a controller for the subsystems, the limiting parameters being selectable by authorized operators by inputting recognized user codes. Reference for instance, the methods and apparatus disclosed in Gormley U.S. Pat. No. 5,513,107 issued Apr. 30, 1996 to Ford Motor Company. In this system, control and configuration of a subsystem can be based on individual recognized operators of the vehicle, or an operating mode can be selected for the vehicle. For example, sport, cruise, luxury, off-road, or other performance modes can be set up and selected. If a vehicle is to be operated by an authorized person who is not a recognized operator or is not authorized to select a mode of operation, stored default operating characteristic parameters are automatically selected. If an authorized person is to be restricted in the possible operation of the vehicle, a predetermined set of stored limited operating characteristic parameters are selected. For example, if a valet is parking the vehicle, predetermined limited operating parameters can be selected from the system memory using a security code input for limiting operability of the vehicle.

However, an observed shortcoming of this known system is that the various control parameters for operation of the vehicle operating subsystems are predetermined and stored in the vehicle memory or other internal data storage device, such that an operator is unable to customize or bring his or her own selected operating parameters to a subject machine, or transfer selected or optimized parameters from one machine to another.

Reference also Gollner et al. U.S. Pat. No. 5,703,345 issued Dec. 30, 1997 to Sauer Inc., which discloses a hydrostatic drive with data carrier control, utilizing a card reader connected to a control unit for the drive and operable for importing different system parameters into the control from an external data card. The control unit is operable to adapt the drive on the different requests and needs of the customer. For instance, different acceleration and deceleration can be transferred from the card to the control unit. It is also disclosed to provide a user interface to allow a user to make changes to the control parameters using input buttons or a keyboard, without involvement of the data card. It is further possible to create a card with sets of system parameters. After the system optimization process of the hydrostatic drive system, all data will be transferred from the hydrostatic control unit to the card reader and programmed to a special "parameter" chip card. On the next start-up, this data will be transferred from the "parameter" chip card to the hydrostatic control unit.

However, this known invention is limited in that it is disclosed only for use with a hydrostatic drive and not other systems such as engine, implement and other control systems. Also, no transferability of the parameter data from one machine to another is disclosed.

As practical examples of these shortcomings of the above referenced known systems, many modern work machines including, but not limited to, construction machines such as excavators, graders, front end loaders, and bulldozers, and forestry machines, mining machines, off highway trucks, and the like, have electronically controlled operating subsystems such as hydraulic systems and the like for controlling lifting and articulation of buckets, blades and other implements, as well as the work machine itself. Such systems can take substantial skill to operate. Sometimes such machines can be damaged when operated by less skilled operators, and when operated negligently by lessees, renters and their employees. Often, it is desirable to limit selected operating parameters of such machines when operated by these persons to protect the owner's investment. Additionally, it may be desired to temporarily disable certain operating capabilities of a machine, or to limit some aspect of the operability of a machine function, for instance, a machine travel speed, or a travel distance such as the height to which a bucket or other implement can be raised so that it can be kept below power lines or other hazards present at a particular job site. Further, an operator may desire to customize one or more selected operating parameters of a machine such as the operator comfort system or the like to suit his or her liking. It is also desirable to have the capability to store the customized or limiting attributes for later use, and for transferring them from machine to machine.

Thus, what is required is a method and apparatus for controlling operating subsystems of a machine such as a work machine, motor vehicle, or the like, which allows an owner and/or operator to customize or limit the parameters for operation of the respective subsystems, and which allows the owner and/or operator to program information representative of the customized or limited parameters in a portable device movable from machine to machine.

Accordingly, the present invention is directed to overcoming one or more of the problems as set forth above.

DISCLOSURE OF THE INVENTION

In one aspect of the present invention a method and apparatus of controlling operating characteristics of at least one operating subsystem of a machine are disclosed. The present method and apparatus provide a control system on the machine including an electronic controller for controlling operation of said subsystem, an internal data storage device containing data readable by the controller representative of an allowable range for controlling an operating parameter for said subsystem, and a data interface operable for allowing the controller to access data contained in an external data storage device. The present method and apparatus additionally provide an external data storage device containing data accessible by the controller representative of at least one preferred value for controlling the operating parameter. The controller is operable to access the at least one preferred value and compare it to the allowable range, and if the at least one preferred value is within the allowable range, then selecting the at least one preferred value for controlling the operating parameter, and if the at least one preferred value is beyond the allowable range, then selecting the allowable range for controlling the operating parameter.

According to a preferred aspect of the invention, the at least one operating subsystem comprises an engine subsystem and a hydraulic subsystem. The subsystems can also or alternatively include operator comfort, transmission, power train, drive train, pneumatic, electrical, attachment, and other machine subsystems.

According to other preferred aspects of the invention, the external data storage device comprises a data card and the data interface comprises a card reader. The data card is preferably programmable using an external data interface such as a card writer connected to a personal computer or the like, to enable an owner or user to program the preferred value or values at a remote location. Alternatively or additionally, the data card can be programmed while connected with the onboard data interface using a conventional wired or wireless data link, the data link including a terminal capable of downloading data connected to the onboard controller or data interface and the interface being provided with a card writing capability. Preferably, the data contained in the portable external data storage device is readable by controllers of at least one other machine for customizing or limiting operation of at least one operating parameter thereof, and the card is movable from machine to machine. The preferred value can optionally comprise a global limiting factor for customizing or limiting operation of a plurality of subsystems of one or more machines.

According to still another preferred aspect of the invention, the operating subsystem comprises a hydraulic system for controlling an implement of the machine and the operating parameter is a travel distance for the implement such as a maximum height to which the implement can be raised.

BEST MODE FOR CARRYING OUT THE INVENTION

Figure 1:
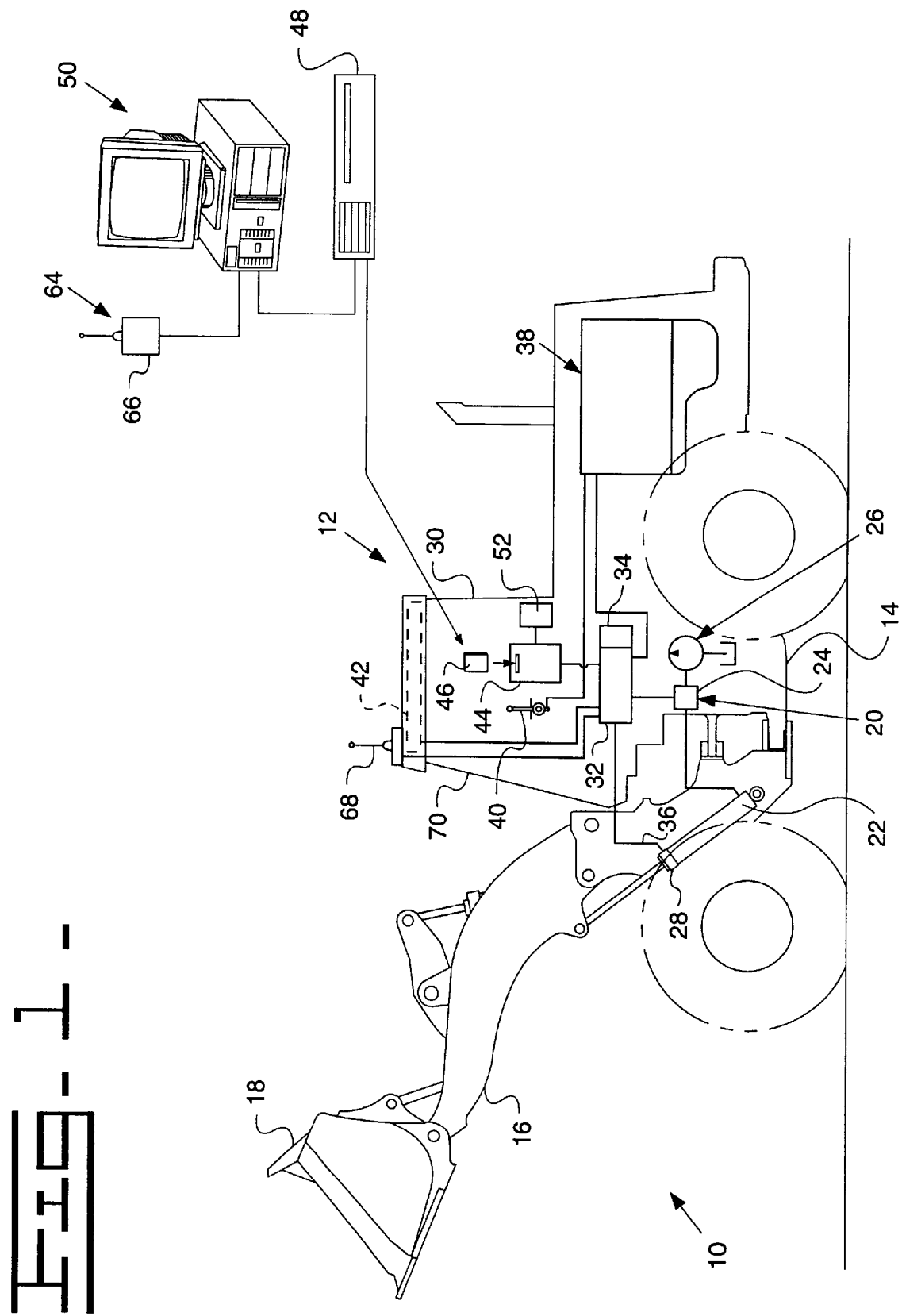
FIG. 1 is a schematic illustration of a work machine including apparatus for controlling operating characteristics of an operating subsystem thereof.

Referring now to the drawings, in FIG. 1 a work machine 10 is shown including apparatus 12 constructed and operable according to the teachings of the present invention for controlling operating characteristics of at least one operating subsystem of work machine 10. Work machine 10 is a wheel loader of conventional construction and operation, including a frame 14 including a lift arm assembly 16 pivotally connected thereto and supporting a bucket 18 adapted for receiving and holding a quantity of material, such as soil, minerals, or the like. Lift arm assembly 16 is vertically pivotable about frame 14 by a hydraulic subsystem 20 for lifting and lowering bucket 18 relative to frame 14. Hydraulic subsystem 20 includes a hydraulic lift cylinder 22 connected between frame 14 and lift arm assembly 16, and an electronically controlled hydraulic valve 24 disposed between a hydraulic pump 26 and cylinder 22 for controlling flow of pressurized hydraulic fluid from pump 26 to cylinder 22 in the conventional manner. Hydraulic subsystem 20 additionally includes a sensor 28 associated with lift cylinder 22 for sensing displacement thereof, which displacement corresponds to vertical travel or height of bucket 18 relative to frame 14.

Actuation of hydraulic valve 24 is under control of an operator operated control (not shown) located in operator cab 30 of machine 10, as limited by an electronic controller 32. Controller 32 includes a data storage device 34 such as a conventional memory chip of the like which includes data representative of an allowable range of travel of bucket 18 as sensed by sensor 28 and communicated to controller 32 via a wire 36.

Work machine 10 additionally includes an engine subsystem 38 connected by a wire to controller 32, including a throttle lever 40 located in operator cab 30 connected by a wire to an engine thereof operable for controlling engine speed, and an operator comfort subsystem 42 for operator cab 30 connected by a wire to controller 32, both subsystems 38 and 42 being operable within operating parameter limitations therefor as stored in data storage device 34 and controlled by controller 32.

Apparatus 12 of the present invention is operable for enabling customizing or limiting the operating parameters of hydraulic subsystem 20; engine subsystem 38; and/or operator comfort subsystem 42, as desired by an owner or operator of work machine 10. In this regard, apparatus 12 includes a data interface 44 including a conventional data card reader operably connected by a wire to controller 32 for allowing controller 32 to access data contained in an external data storage device, preferably a portable data card 46 containing data representative of at least one preferred value for controlling operating parameters of hydraulic subsystem 20, engine subsystem 38, and/or operator comfort subsystem 42, respectively, as well as any other desired conventional subsystems of work machine 10. The data contained on card 46 can be programmed using a conventional card writer such as card writer 48 via input means such as a personal computer 50 or using a conventional onboard data input device 52 located in operator cab 30. The preferred operating information can include selected values for a travel limit of an element of one of the subsystems, such as bucket 18 of hydraulic subsystem 20, and/or operational limits such as upper and/or lower limits for operation of engine subsystem 38, and/or comfort subsystem 42, and/or an overall travel speed limit for machine 10 as controlled by engine subsystem 38 either alone or in combination with another subsystem such as a drive train or brake subsystem also located on machine 10. As more concrete examples, an upper limit for revolutions per minute (RPM) of an engine of engine subsystem 38 may be established or a maximum travel speed for machine 10, or an upper temperature limit for the interior of operator cab 30, all controlled by the data contained on card 46.

As an even more concrete example of control limits for hydraulic subsystem 20, for job sites wherein live overhead electrical wires may be present, it is contemplated that a vertical travel limit for bucket 18 can be provided via data card 46 such that at no time is bucket 18 allowed to be lifted past a safe height above the ground. Here, since the height of bucket 18 is controlled by lift cylinder 22, and sensor 28 is operable to monitor the displacement or elongation of cylinder 22 and provides information representative thereof to controller 32, when cylinder 22 reaches the safe maximum extension, controller 32 is operable to close hydraulic valve 24 thereby halting hydraulic fluid flow to cylinder 22 and further lifting of bucket 18.

Alternatively, the "customizing" parameter data contained on data card 46 could comprise a limiting factor for instance, for limiting extension of lift cylinder 22 to some percentage of its maximum extension (e.g., 80%). Similarly, engine subsystem 38 could be controlled by a limiting factor contained on data card 46, for instance, limiting operation of the engine thereof to 50% of its maximum RPM or maximum throttle, or machine travel speed could be controlled to, for instance, 50% of maximum speed. In either instance, controls in operator cab 30 such as throttle lever 40 can still maintain their same physical travel limits whether the original allowable range of operation as stored in data storage device 34, or the "customized" range or value stored in data card 46, is used. Thus, for instance, a lessee or renter operating work machine 10 using an owner supplied data card containing reduced operating limits would experience the same operating "feel" of machine 10 as an operator operating the machine using a data card 46 containing less limited operating parameter values. Here, it should be pointed out that data card 46 can include data representative of values for controlling selected operating parameters which disable those parameters. For instance, a data card 46 when inserted in data interface 44 could be programmed to include a control value operable to disable any of the machine's subsystems, such as operating comfort subsystem 42. As a further concrete example here, some work machines have subsystems such as hydraulic subsystems, transmissions, and the like that can be damaged if improperly started up or shut down. Presently, to avoid damage to these systems, only qualified maintenance personnel are allowed to start and shut down the machines. According to the present apparatus 12 and method, it is contemplated that a data card 46 supplied to an operator can contain parameter values that prevent start up or shut down by that operator, and that a data card 46 supplied to a maintenance person can include data enabling start up and/or shut down, and additionally such data could be configured for only allowing start up or shut down according to certain parameters or procedures, for instance allowing operation of hydraulic pumps or valves only after sufficient time has elapsed for the hydraulic oil to warm to a desired operating temperature.

As noted above, apparatus 12 can include an optional input device 52 connected to data interface 44 to enable a user to program data on data card 46 when inserted in the card reader. Using input device 52 an owner or operator is able to select and program or write preferred operating parameter control limits onto data card 46 during experimentation or actual use of the subject subsystem or subsystems of work machine 10. Additionally or alternatively, data card 46 can be programmed in the same manner using card writer 48 of personal computer 50 in the conventional manner.

Figure 2:
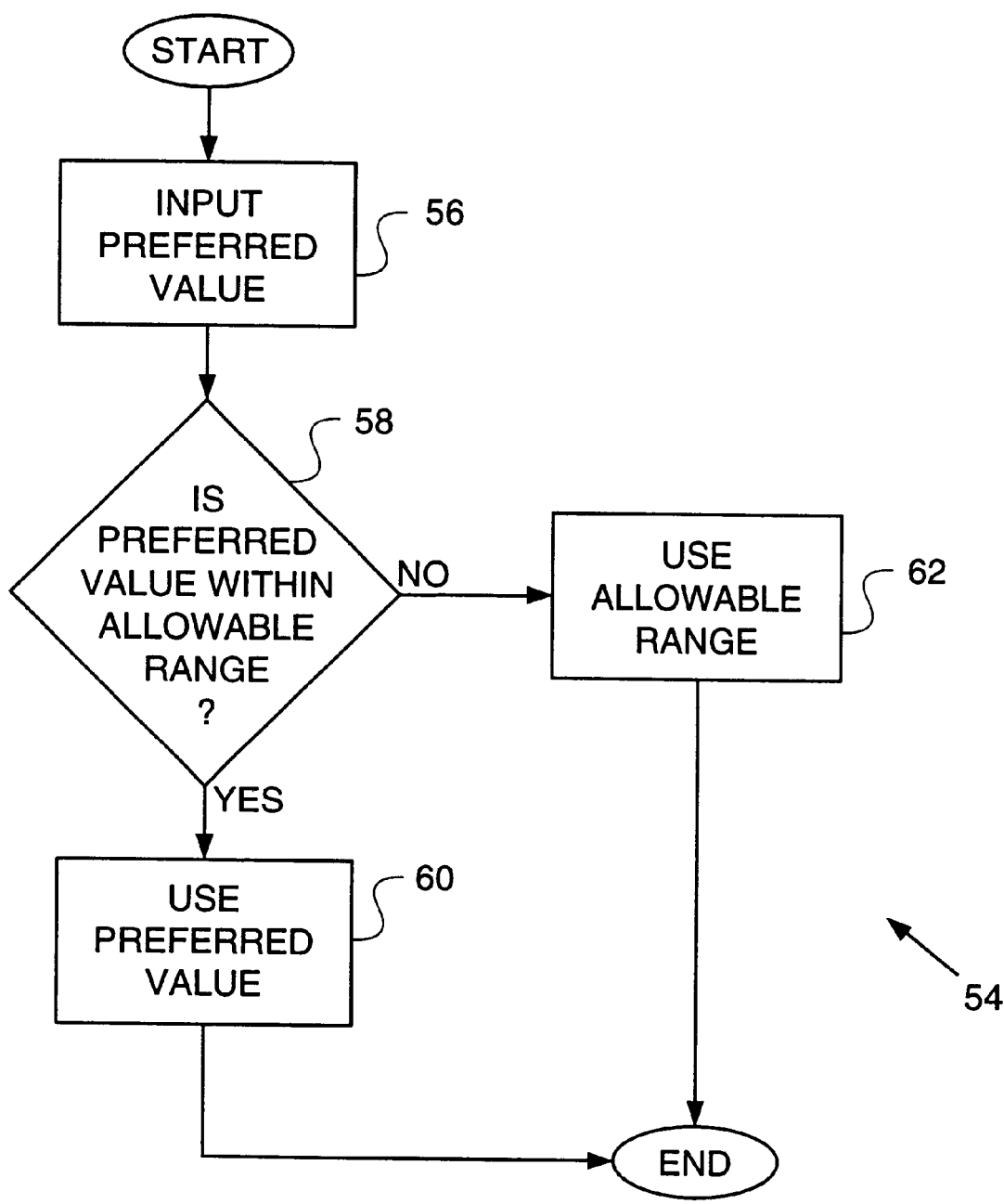
FIG. 2 is a flow diagram showing a method of the present invention.

Referring also to FIG. 2, a flow diagram 54 illustrating a method of operation of present apparatus 12 is shown. At block 56 at least one preferred value for an operating parameter of a subsystem such as subsystems 20, 38, and 42 of machine 10 is inputted by inserting data card 46 into the card reader of data interface 44 so as to be accessed by controller 32. As shown at block 58, controller 32 determines whether the at least one preferred value is within the allowable range contained in data storage device 34. If yes, the at least one preferred value is used for controlling the subject subsystem, as illustrated at block 60. If no, the allowable range contained in storage device 34 is used, as shown at block 62. After operation of work machine 10 is concluded, data card 46 can be removed and inserted into the card reader of another machine for operation of control systems thereof in accordance with the limitations contained on the data card. Thus, it is contemplated that an operator such as a lessee or renter, or a less experienced operator, will carry a personal data card programmed to allow only limited operability of certain selected subsystems of a machine, to prevent damage to the subsystems or for other reasons. In this regard, it is also contemplated that data card 46 can include other information and/or limitations, for instance, durational limitations which would disable engine subsystem 48 when machine 10 has been operated for a particular lease or rental period, or wherein machine 10 is operated to a point wherein a particular service is required, such as an oil change, lubrication, or the like.

It is further contemplated that data card 46 can be programmed by a computer such as computer 50 at a remote location using a conventional wired or wireless data link, such as wireless data link 64 shown, including a data transmitter/receiver 66 connected to computer 50 at the remote location and a transmitter/receiver 68 on machine 10 connected to controller 32 and/or data interface 441 here transmitter/receiver 68 being connected to controller 32 via a wire 70. Using data link 64, running information from machine 10 can be uploaded to computer 50 to enable a machine owner or other person to monitor operation or other parameters, and data for programming card 46 can be downloaded from computer 50 to machine 10, data interface 44 having a card writing capability for changing the data on card 46. Relating this capability to the concrete example above, when machine 10 is no longer being used at a job site where overhead wires are a danger, or for some other reason, such as monitoring of operation indicates that some operating range restriction can be removed or changed, for instance, an operator's skill level has improved enabling the maximum travel speed for the machine when driven by that operator to be increased, the appropriate changes can be made to the data contained on data card 46 via data link 64. Once the changes are downloaded and written on data card 46, the corresponding operating parameters are controlled by the changed data, as long as the data is within the allowable range, and the same card 46 is used. That is, if the changed data card 46 is removed from data interface 44, and a different card 46 is inserted, machine 10 will be operated according to the data contained on the new card, if the data on the new card is within the allowable range. The original changed data card 46 can then be used in a different machine, or later in machine 10, to control the selected operating parameters using the data contained on the card.

Industrial Applicability

The present invention has utility for use with a wide variety of machines, including, but not limited to, the work machines enumerated above, as well as motor vehicles, and the like. The subsystems controllable using the present invention can include, but are not limited to, hydraulic, engine and operator comfort subsystems, and additionally other systems, including the transmission, power train, drive train, pneumatics, electrical, attachments, and other element subsystems.

Other aspects, objects and advantages of the present invention can be obtained from a study of the drawings, the disclosure and the appended claims.

What is claimed is:

1. A method of controlling operating characteristics of at least one operating subsystem of a machine, comprising the steps of;
   providing a control system on said machine including an electronic controller for controlling operation of said subsystem, an internal data storage device containing data readable by the controller representative of an allowable range for controlling an operating parameter for said subsystem, and a data interface operable for allowing the controller to access data contained in an external data storage device;
   providing an external data storage device containing data accessible by the controller representative of at least one preferred value for controlling the operating parameter;
   accessing the at least one preferred value and comparing it to the allowable range, and:
      if the at least one preferred value is within the allowable range, then selecting the at least one preferred value for controlling the operating parameter; and
      if the at least one preferred value is beyond the allowable range, then selecting the allowable range for controlling the operating parameter.

2. The method of claim 1, wherein the at least one operating subsystem comprises an engine subsystem and a hydraulic subsystem.

3. The method of claim 2, wherein the engine subsystem comprises a throttle control.

4. The method of claim 1, wherein the at least one operating subsystem comprises an operator comfort subsystem.

5. The method of claim 1, wherein the external data storage device comprises a data card and the data interface comprises a card reader.

6. The method of claim 1, wherein the at least one operating subsystem comprises a hydraulic system for controlling an implement of the machine and the operating parameter is a travel distance for the implement.

7. The method of claim 6, wherein the travel distance corresponds to a maximum height to which the implement can be raised.

8. The method of claim 1, wherein the data contained in the external data storage device is user programmable using an external data interface.

9. The method of claim 1, wherein the controller is operable for disabling the operating parameter when the preferred value equals a predetermined value.

10. The method of claim 1, wherein the at least one preferred value for controlling the operating parameter comprises a limiting factor for decreasing the allowable range.

11. Apparatus for controlling operating characteristics of at least one operating subsystem of a machine, comprising;
    a control system on said machine including an electronic controller for controlling operation of said subsystem, an internal data storage device containing data readable by the controller representative of an allowable range for controlling an operating parameter for said subsystem, and a data interface operable for allowing the controller to read data contained in a portable external data storage device; and
    a portable external data storage device containing data readable by the controller representative of at least one preferred value for controlling the operating parameter;
    wherein the controller is operable for reading the at least one preferred value and comparing it to the allowable range; and
    if the at least one preferred value is within the allowable range, then selecting the at least one preferred value for operating said subsystem; and
    if the at least one preferred value is beyond the allowable range, then selecting the allowable range for operating said subsystem.

12. Apparatus of claim 11, wherein the at least one operating subsystem comprises an engine subsystem and a hydraulic subsystem.

13. Apparatus of claim 12, wherein the engine subsystem comprises a throttle control.

14. Apparatus of claim 11, wherein the at least one operating subsystem comprises an operator comfort subsystem.

15. Apparatus of claim 11, wherein the portable external data storage device comprises a data card and the data interface comprises a card reader.

16. Apparatus of claim 11, wherein the at least one operating subsystem comprises a hydraulic system for an implement of the machine and the operating parameter is a travel distance for the implement.

17. Apparatus of claim 16, wherein the travel distance corresponds to a maximum height to which the implement can be raised.

18. Apparatus of claim 11, wherein the data contained in the portable external data storage device is readable by a controller of at least one different machine for customizing or limiting operation of at least one corresponding operating parameter thereof.

19. Apparatus of claim 11, wherein the at least one preferred value comprises a global limiting factor for limiting operation of a plurality of subsystems of the machine.

20. Apparatus of claim 11, wherein the data contained in the portable external data storage device is programmable at a remote location.

21. A method of controlling operating characteristics of at least one operating subsystem of a machine, comprising the steps of:
    providing a control system on said machine including an electronic controller for controlling operation of said subsystem, an internal data storage device containing data readable by the controller representative of an allowable range for controlling an operating parameter for said subsystem, and a data interface operable for allowing the controller to access data contained in an external data storage device;
    providing an external data storage device containing data accessible by the controller representative of at least one preferred value for controlling the operating parameter on the machine and containing data accessible by the controller representative of at least one preferred value for controlling an operating parameter for an other machine;
    accessing the at least one preferred value for controlling the operating parameter on the machine and comparing it to the allowable range;
    if the at least one preferred value for controlling the operating parameter on the machine is within the allowable range, then selecting the at least one preferred value for controlling the operating parameter on the machine for controlling the operating parameter;
    if the at least one preferred value for controlling the operating parameter on the machine is beyond the allowable range, then selecting the allowable range for controlling the operating parameter.

22. Apparatus for controlling operating characteristics of at least one operating subsystem of a machine, comprising:
    a control system on said machine including an electronic controller for controlling operation of said subsystem, an internal data storage device containing data readable by the controller representative of an allowable range for controlling an operating parameter for said subsystem, and a data interface operable for allowing the controller to read data contained in a portable external data storage device;
    a portable external data storage device containing data readable by the controller representative of at least one preferred value for controlling the operating parameter;
    wherein the controller is operable for reading the at least one preferred value and comparing it to the allowable range;
    if the at least one preferred value is within the allowable range, then selecting the at least one preferred value for operating said subsystem;
    if the at least one preferred value is beyond the allowable range, then selecting the allowable range for operating said subsystem; and
    wherein the portable external data storage device is operative to contain additional data for at least one operating subsystem of an other machine.

* * * * *